United States Patent [19]

Nomura et al.

[11] 4,268,079
[45] May 19, 1981

[54] SHOCK ABSORBING BUMPER

[75] Inventors: Takao Nomura, Toyota; Yoshiro Umemoto, Nagoya; Yasuhiro Mishima; Tugumi Sanmiya, both of Toyota, all of Japan

[73] Assignee: Toyota Jidosha Kogyo Kabushiki Kaisha, Aichi, Japan

[21] Appl. No.: 43,708

[22] Filed: May 30, 1979

[30] Foreign Application Priority Data

May 30, 1978 [JP] Japan .............................. 53-72289[U]
May 30, 1978 [JP] Japan .............................. 53-72291[U]

[51] Int. Cl.³ .............................................. B62D 35/00
[52] U.S. Cl. ....................................... 293/120; 52/717
[58] Field of Search .................... 293/120, 109, 108, 1; 114/219; 52/716, 717, 718

[56] References Cited

U.S. PATENT DOCUMENTS

| 3,841,679 | 10/1974 | Muller | 293/1 X |
| 3,842,565 | 10/1974 | Brown | 293/1 X |
| 3,897,967 | 8/1975 | Barenyi | 293/120 |
| 3,938,842 | 2/1976 | Ruhl | 52/716 X |
| 4,103,400 | 8/1978 | Munse | 52/717 |

FOREIGN PATENT DOCUMENTS 2420523  6/1975  Fed. Rep. of Germany .... 293/69 R

Primary Examiner—John P. Silverstrim
Assistant Examiner—Norman L. Stack, Jr.
Attorney, Agent, or Firm—Browdy & Neimark

[57] ABSTRACT

A shock absorbing bumper adaptable for mounting onto the front and rear of a vehicle such as an automobile, the bumper comprising an elastic external member having sheathed therein a flexible core material and a decorative facing provided on the front side of the external member. An elastic facing base having formed on its front side the elastic decorative facing is provided on its rear side with a hook or hooks which fit into the corresponding slits formed in the front portion of the external member and are engaged therein in such a way that they overhang the edges of the slits while the rims of the facing base fit in the lateral notches also formed in the external member.

14 Claims, 19 Drawing Figures

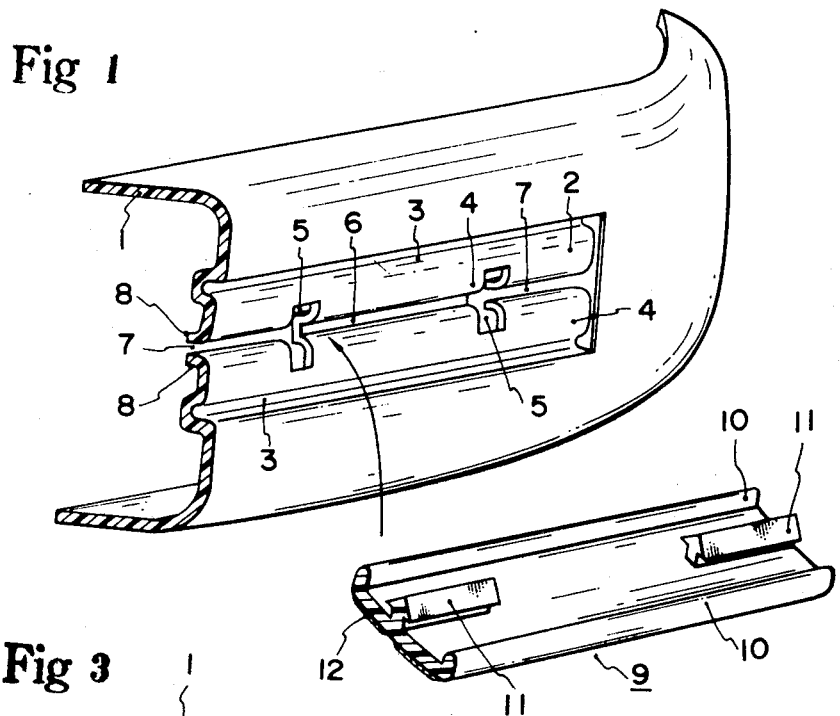
Fig 1
Fig 2
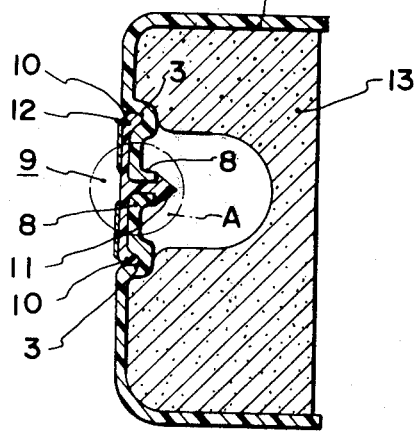
Fig 3
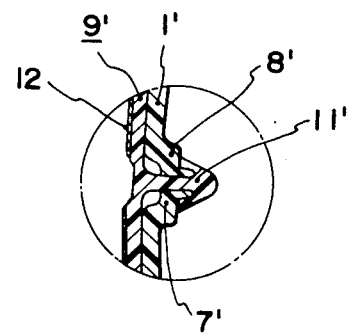
Fig 4

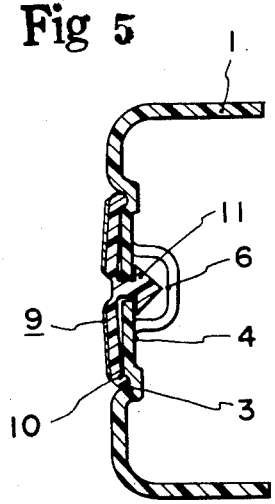
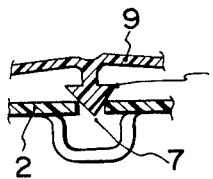
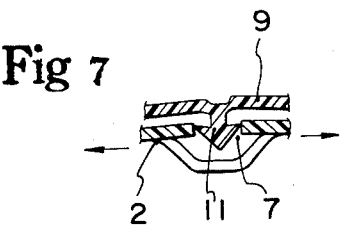
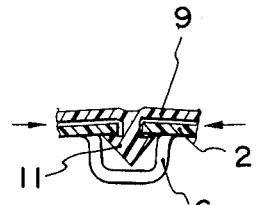
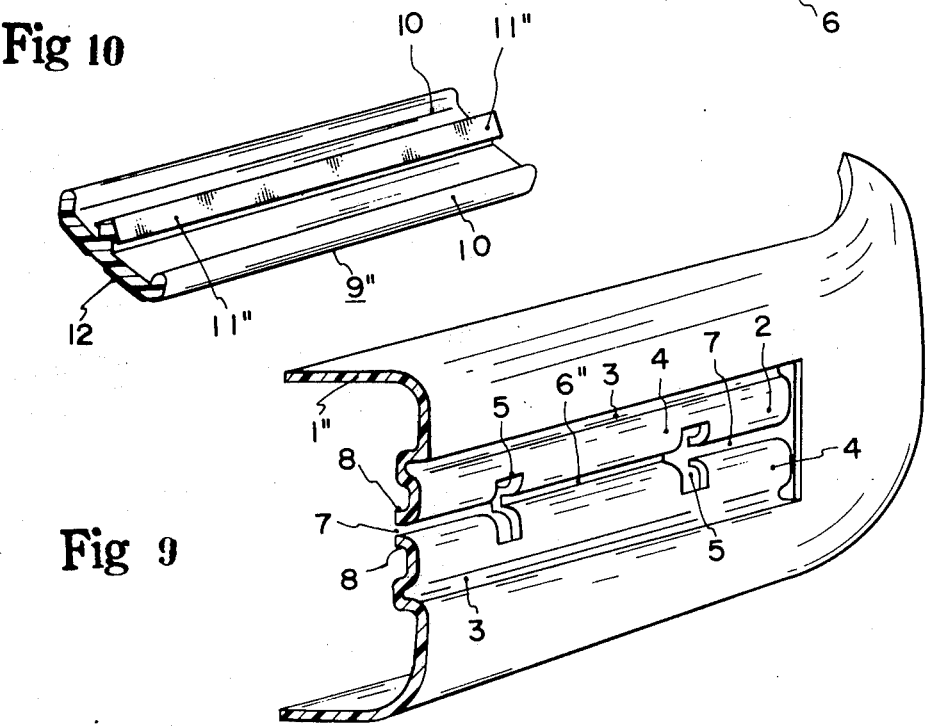

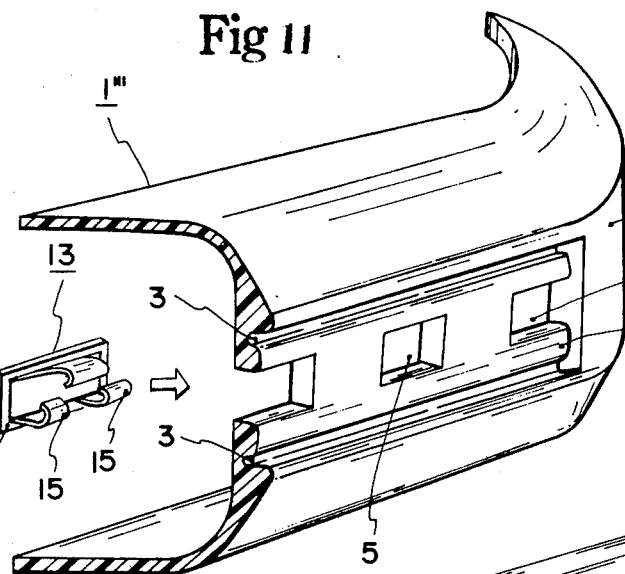
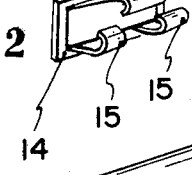
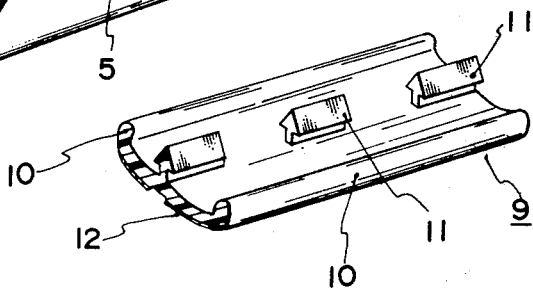
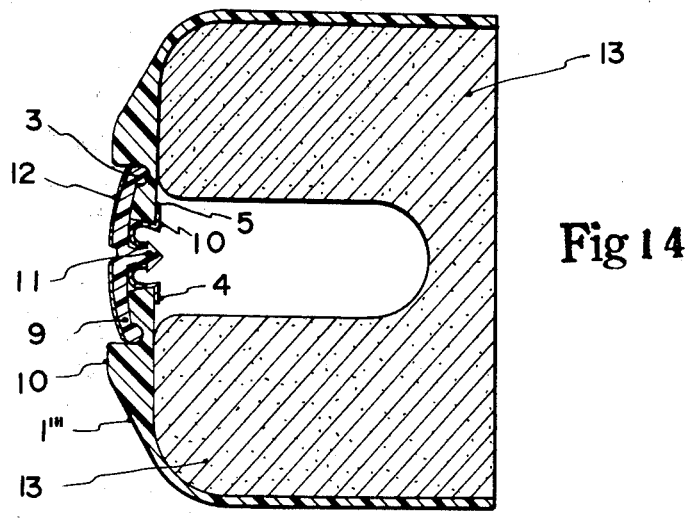

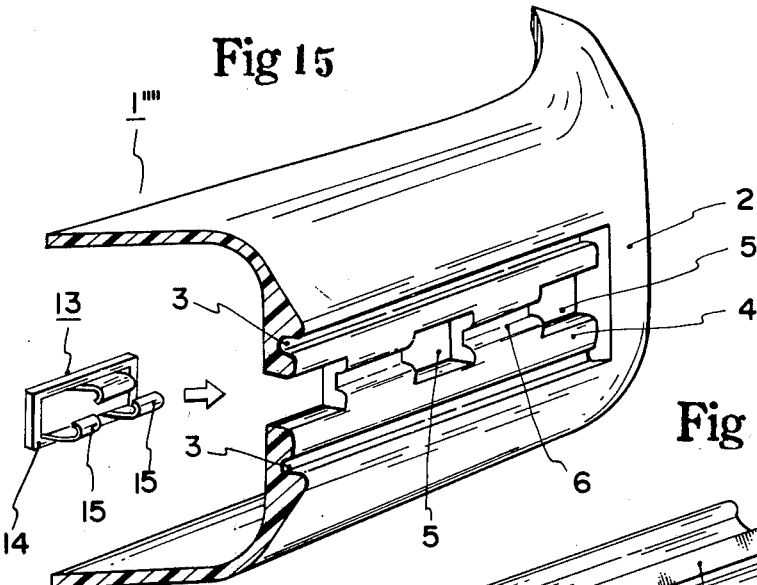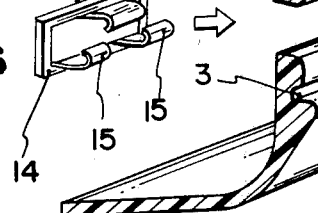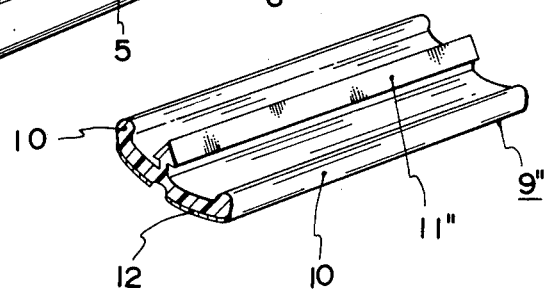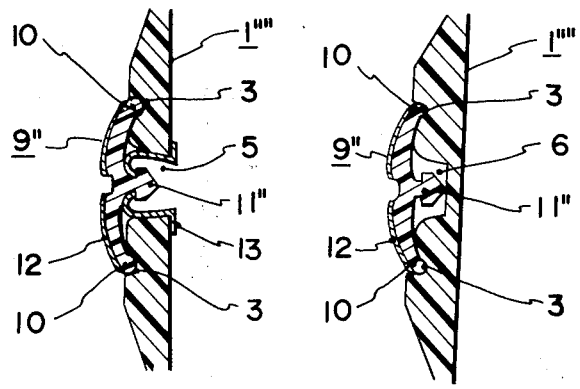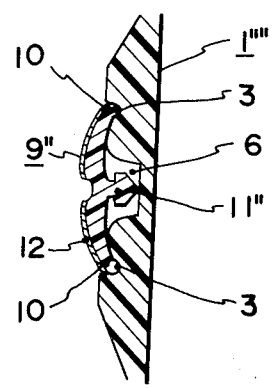

SHOCK ABSORBING BUMPER

FIELD OF THE INVENTION

This invention relates to a shock absorbing bumper adaptable for mounting onto the front and rear of a vehicle.

BACKGROUND OF THE INVENTION

Vehicles such as automobiles are normally mounted with a bumper designed to attenuate the shock of collision, but most of the conventional bumpers are made of a metal material with metallic plating.

Such metal-made bumpers have indeed an aesthetic merit but are limited in elasticity and hence poor in shock absorptivity. Efforts for overcoming such problems while satisfying the intensified safety regulations have led to the development of a shock absorbing bumper composed of an elastic external member made of an elastic material such as an urethane elastomer and a flexible core member made of urethane foam or such.

Such an elastic bumper, although excellent in shock absorptivity, still has the problem of poor outward appearance. An answer to this question is the integral provision of a decorative facing on the surface portion of the external member.

The decorative face used for this purpose is of high rigidity as it is usually formed from metal or aluminized resin strips, so that in the event of collision, although the striking energy itself may be absorbed, the decorative facing would suffer plastic deformation and become unable to restore to its original shape because such a decorative facing is less elastic than the external and core members. Thus, the original facing design would be impaired even by a slight degree of collision, for example by initial collision in low-speed running at, say, 8 kg/hr, and even though the shock sbsorbing performance of the bumper per se is undamaged, its replacement would be necessitated. Such a shock absorbing bumper with a facing, therefore, had the disadvantage in high maintenance cost in addition to the trouble involved in incorporating such a facing.

SUMMARY OF THE INVENTION

The first object of this invention is to eliminate the problems inherent to the conventional elastic bumper devices, and the second object of this invention is to provide an improved shock absorbing bumper structure in which the elastic facing is fixed in position in slits in the external member by means of overhanging engagement of a hook or hooks provided on the rear side of the facing with the corresponding flanges of the slits, thereby to vest the facing with the ability to restore to its shape with the external bumper member and to allow easy incorporation of such facing.

In order to accomplish these objects, there is provided according to this invention an improved manner for incorporating the decorative facing onto an elastic bumper according to which the rim of the elastic facing base which is provided on its front side with the elastic decorative facing, is secured into notches formed in the front surface of the external bumper member while the hooks on the rear side of the facing base are inserted into the lateral slits formed centrally in the external member so that the hooks will overhang the edges of the slits to thereby fix the facing base in position on the external bumper member and, if need be, further ensuring such fixing by using clipping means, whereby in the event of collision, the striking energy is absorbed by both the external elastic member and the internal flexible core member while the elastic facing base, which is fixed to the external bumper member, undergoes integral elastic deformation and can restore to its original shape with both bumper members without being damaged in its aesthetic appearance.

BRIEF DESCRIPTION OF THE DRAWINGS

FIG. 1 is a partial perspective view of an elastic external bumper member;

FIG. 2 is a partial perspective view of an elastic facing base;

FIG. 3 is a sectional view of a shock absorbing bumper;

FIG. 4 is an enlarged sectional view showing another embodiment of fixing arrangement at the encircled portion in FIG. 3;

FIGS. 5, 6, 7 and 8 are schematic drawings illustrating a mode of incorporation of the elastic facing base;

FIG. 9 is a view similar to FIG. 1 but showing another embodiment of the bumper structure according to this invention;

FIG. 10 is a view similar to FIG. 2 but showing another embodiment of the elastic facing base;

FIG. 11 is a perspective view, partly shown in section, of still another embodiment of the external bumper member;

FIG. 12 is a perspective view of a clipping element;

FIG. 13 is a partial perspective view of an elastic facing base;

FIG. 14 is a sectional view of a shock absorbing bumper;

FIGS. 15, 16 and 17 show another embodiment of the parts shown in FIGS. 1 and 2;

FIG. 18 is a sectional view showing adaptation of another embodiment of clipping means; and FIG. 19 is a general sectional view thereof.

DESCRIPTION OF THE PREFERRED EMBODIMENTS

Referring to FIGS. 1 to 8, which show a first embodiment of this invention, numeral 1 designates an elastic external bumper member made of an urethane elastomer. At the facing mounting portion 2 on the front side of the external member 1 are horizontally provided a pair of notches 3, 3 and a pair of raised portions 4, 4 arranged parallel to each other. In the raised portions 4, 4 are formed a plurality of angular holes 5, 5 arranged at fixed intervals along the length of the raised portions, and notches 6 and slits 7 are provided alternately between the angular holes 5, 5. It will be noted that the edges 8, 8 of the respective raised portions 4, 4 are opposed to each other in each slit 7.

Numeral 9 refers to an elongated elastic facing base which is separately molded and designed to be attached to the portion 2 of the external bumper member 1. This facing base 9 is suitably molded from an urethane elastomer and substantially C-shaped in section. Both edges of the base 9 are bent inwardly to form the rims 10, 10 which fit into the corresponding notches 3, 3 of the external bumper member 1. Also provided integrally on the curved back side of the facing base 9 are the hooks 11, 11 which are arrow-shaped in section and designed to fit into the slits 7, 7 of the external bumper member 1.

Attached integrally to the front side of the elastic facing base 9 by double-coated tapes or other means is an elastic decorative facing 12 having a metallic luster which can be made, for example, from an aluminized transparent PVC film.

Numeral 13 indicates an urethane foam flexible core member which is suitably sheathed in the external member 1.

For securing the elastic facing base 9 in position on the elastic external bumper member 1, first the inwardly bent rims 10, 10 of the former are fitted into the corresponding notches 3, 3 in the latter and the hooks 11, 11 on the back side of the facing base are pressed into the corresponding slits 7, 7, whereby each slit 7 is spread out by the end undercut portion of the corresponding hook 11 owing to elasticity provided by the angular holes 5, 5, and when the undercut portion is placed in the slit 7, the slit 7 returns to its original form by springback and the hook 11 is securely held by the edges 8, 8 as shown in FIGS. 3 and 5.

More specifically, in the process of forced insertion of each hook 11 of the elastic facing base 9 into the corresponding slit 7 in the external member 1, the slit 7 is first spread out owing to its elasticity to the full width of the hook 11 as shown in FIGS. 6 and 7, and upon insertion, the slit 7 is brought into a condition where the neck of the hook 11 is engaged with the edges 8, 8 as shown in FIG. 8, and such engagement is further ensured by the spring action of the U-shaped notches 6.

Of course any vertical and horizontal movement of the facing base 9 relative to the external bumper member 1 is inhibited by the engagement of the slits, edges 8 and hooks 11 and the engagement of the notches 3 and rims 10, and hence there is no likelihood of dislocation or removal of the facing base 9 from the external member 1. Finally, the U-sectioned flexible core member 13 is set properly in the external member 1.

In the event of collision, the striking energy is absorbed by the elastic external member 1 and the flexible core member 13, and both members undergo an elastic deformation and immediately restore to their original shapes.

Needless to say, the elastic facing base 9, which is integrally secured to the external member 1, is also integrally deformed therewith without removal and restores to its original shape. Of course, the decorative facing 12 provided on the front surface of the elastic facing base 9 is also deformed accordingly and restores to its shape after the pattern of the facing base 9, so that the aesthetic effect of the decorative facing remains unchanged.

The mode of adaptation of this invention is not limited to the above-described embodiment but it may be embodied in other forms. For example, the decorative facing may be provided by painting, vacuum deposition or other like means or may be subjected to a surface treatment such as spattering. Also, engagement of the elastic facing base to the external bumper member may be effected as shown in FIG. 4, that is, the edges 8' of each slit 7' in the external member 1' are so formed as to project inwardly and the end of each corresponding hool 11' on the facing base 9' is so undercut as to tightly engage with the projected edges 8', thereby providing even more secure hooked engagement.

The elastic facing base may not necessarily be attached to the front side of the elastic external member but may be provided to the top face or both side faces. Also, letters, marks, etc., indicating the vehicle type or such may be inscribed at any suitable spot on the top face, front portion, corner, etc., of the external bumper member.

In the embodiment shown in FIGS. 9 and 10, each central notch 6" in the external member 1" is made deeper by a predetermined amount than the effective depth of the edges 8, 8 of the slits 7, 7 on both sides of the notch 6", and a single strip of hook 11" is provided on the elastic facing base 9".

In this embodiment, the rims 10, 10 are engaged into the notches 3, 3 and the hook 11" is forced into the slits 7 and notches 6" so that the undercut portion of the hook 11" is held by the edges of the slits 7 in the same way as described above to secure the facing against accidental removal. The elastic engagement of the hook 11" with the notches 6" is ensured by the sufficient depth of the bottom portion, thus inhibiting not only removal but also lateral movement of the facing. Absorption of striking energy and restoration of the facing from in the event of collision are accomplished likewise as in the preceding embodiment.

In still another embodiment shown in FIGS. 11 to 14, the U-sectioned elastic external member 1''' is made from an urethane elastomer by a suitable molding means as in the case of the preceding embodiments, and at the front part 2 thereof is provided a raised portion 4 provided with notches 3, 3 along the upper and lower sides thereof, the raised portion 4 being also formed with a predetermined number of angular holes 5, 5 arranged horizontally at certain given intervals.

The elastic facing base 9 and the decorative facing 12 provided thereon are the same as those described above and shown in FIG. 2.

Shown in FIG. 12 is a clip 13 formed corresponding to the hook 11 on the elastic facing base 9. This clip 13 is made by first die-punching a plate and then subjecting it to press molding so that the claws 15 will project from the upper and lower edges of a rectangular frame 14.

For assembling the parts, the rims 10, 10 of the elastic facing base 9 are engaged into the corresponding notches 3, 3 in the front surface of the external bumper member 1''' so that the hooks 11, 11 on the facing base 9 will be positioned in the corresponding square holes 5, 5 in the member 1''' while the curved backside surface of the facing base 9 is closely attached to the corresponding surface of the external member 1''' (both the backside surface of the facing base and the corresponding surface of the member 1''' are the same in curvature). Under this condition, the clips 13, 13 are adapted to the corresponding hooks 11, 11 from the back side of the external member 1''' so that the claws 15, 15 hold the respective hooks 11, 11 whereby the elastic facing base 9 is fixedly secured to the external bumper member 1'''. Finally, a U-sectioned urethane foam flexible core member 13' is tightly inserted into the external member 1''' as shown in FIG. 14.

The attachment of the elastic facing base 9 may be effected by using double-coated tapes. Also, the facing base 9 may be so formed that the curvature of its back side is slightly smaller than that of the recessed portion so that desired fitting may be accomplished by slightly spreading out the facing base by making use of its elasticity.

The decorative facing may of course be provided by employing other means such as vacuum deposition, dry spattering, etc., instead of using the film.

If the shock absorbing bumper is mounted on an automobile, when an impact force is exerted thereto as in the event of collision, the resultantly produced striking energy is absorbed by the elastic external member 1''' and flexible core member 13 and both members can soon elastically restore to their original forms. Also, because of its own elasticity and secure engagement by the rims 10, 10, hooks 11 and clips 13, the elastic facing base 9 follows the same pattern of deformation and restoration as the external member 1''', and particularly, the base won't suffer any plastic deformation in the event of collision in low-speed running.

In still another embodiment of this invention shown in FIGS. 15 and 17, the external bumper member 1'''' is provided with the shallow notches 6, 6 between the through-holes 5, 5 in the central raised portion 4, the notches 6, 6 being of a depth not reaching the back side of the member 1'''', while the elastic facing base 9'' is the same as used in the embodiment shown in FIG. 10.

In this embodiment, no lateral centering is required when positioning the elastic facing base 9'' to the central raised portion 4 of the external bumper member 1'''', and a single strip of hook 11'' is forced into the through-holes 5, 5 and notches 6 and then the clips 13 are attached to the hook 11'' in the through-holes 5, 5 so that the hook 11'' is securely engaged with the claws 15, 15.

The mode of assemblage is illustrated by a sectional view of a through-hole of FIG. 18 and a general sectional view of FIG. 19.

The shock absorbing effect and retainability of the original aesthetic appearance of the facing are the same as in the preceding embodiment.

It will be readily understood that this invention is not limited to the above-described embodiments but may be embodied in various other forms. For instance, the elastic facing base may not necessarily be provided to the front portion of the external bumper member but may be provided to its top face or corners on both sides. Also, the letters, marks, etc., indicating the vehicle type or such may be inscribed at any pertinent spot of the top face, corners, etc., of the external member.

As described above, there is provided according to this invention, an improved shock absorbing bumper structure comprising an elastic external member having formed in its front part a pair of horizontal notches and a row of holes centrally thereof, and an elastic facing base provided on its front side with an elastic decorative facing and centrally on its back side with a hook or hooks for fixing the facing base to the external bumper member. Thus, basically both the elastic facing and the elastic external bumper member can be molded separately from each other and simply assembled together, so that the manufacturing processes of these parts won't intervene with each other and hence are extremely easy to carry out.

Also, the assembling work for the two parts can be accomplished very efficiently as the rim and notch engagement as well as the slit, hook and/or clip engagement can be achieved by a single operation with ease. Further, since the hooks are engaged with the edges of the corresponding slits and/or clips by making use of their spring-back, there is eliminated any risk of accidental removal of the facing.

Thus, according to the present invention, the striking energy produced in the event of collision is absorbed by both elastic external member and internal flexible core member and both members can soon restore to their original shapes, while the elastic facing base follows the completely same pattern of deformation and restoration as both members and hence the elastic decorative facing provided on the facing base won't suffer plastic deformation but can easily restore its original form to maintain its aesthetic design effect.

What is claimed is:

1. A shock absorbing bumper having an elastic decorative facing secured to a recessed portion provided horizontally on an external surface of an elastic external bumper member which has sheathed therein a flexible core member, the improvement wherein a pair of notches are provided in said recessed portion along its length, a row of holes are provided between said notches, and slits are provided between every pair of said holes while an elastic facing base has on its outer surface the decorative facing, is provided on its rear side with at least one hook designed to engage in said slits and has rims designed to engage in said notches.

2. A shock absorbing bumper according to claim 1, wherein said holes are square in shape.

3. A shock absorbing bumper according to claim 1, wherein said notches are arrow-shaped in section.

4. A shock absorbing bumper according to claim 1, wherein said decorative facing is a vacuum-deposited aluminum foil.

5. A shock absorbing bumper according to claim 1, wherein said decorative facing is of dry spattering.

6. A shock absorbing bumper according to claim 1, wherein said decorative facing is an elastic thin film.

7. A shock absorbing bumper according to claim 1, wherein said decorative facing is a Tedlar film.

8. A shock absorbing bumper according to claim 1, wherein a further notch is provided between and connects every pair of said holes and a single said hook is provided on the rear side of said elastic facing base.

9. A shock absorbing bumper according to claim 8, wherein a plurality of clips are engaged with the hook on said elastic facing base from the rear side of respective said holes.

10. A shock absorbing bumper according to claim 9, wherein each of said clips has claws designed to engage with said hook.

11. A shock absorbing bumper according to claim 9, wherein said clips are made of a metal.

12. A shock absorbing bumper according to claim 1, wherein said notches and slits are provided alternately between said holes and a plurality of hooks are provided on said elastic facing base in correspondence to said slits.

13. A shock absorbing bumper according to claim 12, wherein edges of each said slit are bent to project inwardly and each of said hooks is provided with an undercut corresponding in shape to projecting edges of each said bent slit.

14. A shock absorbing bumper according to claim 1, wherein said notches and said slits are provided alternately between said holes and said at least one hook is a single hook provided on said elastic facing base.

* * * * *